(12) United States Patent
Saddik et al.

(10) Patent No.: US 11,530,464 B2
(45) Date of Patent: *Dec. 20, 2022

(54) COMPOSITE IRON PELLETS AND METHODS OF MAKING SAME

(71) Applicant: SABIC GLOBAL TECHNOLOGIES B.V., Bergen Op Zoom (NL)

(72) Inventors: Mohamed Bahgat Saddik, Jubail (SA); Hesham Ahmed Hanafy, Jubail (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 331 days.

This patent is subject to a terminal disclaimer.

(21) Appl. No.: 15/565,444

(22) PCT Filed: Apr. 18, 2016

(86) PCT No.: PCT/IB2016/052207
§ 371 (c)(1),
(2) Date: Oct. 10, 2017

(87) PCT Pub. No.: WO2016/170467
PCT Pub. Date: Oct. 27, 2016

(65) Prior Publication Data
US 2018/0119248 A1 May 3, 2018

Related U.S. Application Data

(60) Provisional application No. 62/152,291, filed on Apr. 24, 2015.

(51) Int. Cl.
*C22B 1/245* (2006.01)
*C21B 13/00* (2006.01)
*C22B 1/24* (2006.01)

(52) U.S. Cl.
CPC .......... *C22B 1/245* (2013.01); *C21B 13/0046* (2013.01); *C22B 1/2406* (2013.01); *C22B 1/2413* (2013.01); *Y02P 10/134* (2015.11)

(58) Field of Classification Search
CPC ....................................................... C22B 1/245
(Continued)

(56) References Cited

U.S. PATENT DOCUMENTS 3,134,667 A * 5/1964 Halowaty ............. C22B 1/2406
75/319
4,504,306 A * 3/1985 Miyashita ............... C22B 1/245
23/313 P (Continued)

FOREIGN PATENT DOCUMENTS

CA 2560085 C * 7/2014 ........... C22B 1/2413
CN 101070558 11/2007

(Continued)

OTHER PUBLICATIONS

Powell et al. ASM International Handbook Committee.(2008; 2010). ASM Handbook, vol. 15—Casting, (pp. 104-105). ASM International (Year: 2010).*

(Continued)

*Primary Examiner* — Jophy S. Koshy
*Assistant Examiner* — Joshua S Carpenter
(74) *Attorney, Agent, or Firm* — Norton Rose Fulbright US LLP

(57) ABSTRACT

Disclosed herein are methods and compositions for producing composite pellets comprising a core comprising: iron ore and a carbonaceous reducing agent; and a shell comprising: iron ore; and having a core and shell transition in a manner such that no visible boundary exists between the core and the shell in a cross-section of the pellet. The methods can be used to produce composite pellets with improved produc- (Continued)

tivity and quality, and the resulting composite pellets can be used to produce direct reduced iron (DRI).

17 Claims, 1 Drawing Sheet

(58) Field of Classification Search
USPC .......................................................... 75/504
See application file for complete search history.

(56) References Cited

U.S. PATENT DOCUMENTS

| 6,342,089 | B1 * | 1/2002 | McGaa | ................... | C22B 1/245 75/319 |
|---|---|---|---|---|---|
| 2018/0119248 | A1 | 5/2018 | Saddik et al. | | |

FOREIGN PATENT DOCUMENTS

| EP | 3286345 | | | 2/2018 | |
|---|---|---|---|---|---|
| GB | 1305727 | | | 2/1973 | |
| GB | 1305727 | A | * | 2/1973 | ............ C22B 1/2406 |
| JP | 53108813 | | | 9/1978 | |
| JP | 2008214715 | A | * | 9/2008 | ............. C22B 1/242 |
| WO | WO 2005/103307 | | | 11/2005 | |
| WO | WO 2016/170467 | | | 10/2016 | |

OTHER PUBLICATIONS

Kogel et al. Industrial Minerals and Rocks—Commodities, Markets, and Uses (7th Edition)—Appendix B: Sieve Chart. (2006). (pp. 1499). Society for Mining, Metallurgy, and Exploration (SME) (Year: 2006).*

J-Pait Pai machine translation of JP2008-214715 retreived on Sep. 6, 2019 (Year: 2008).*

Fahim, Mohamed A. Alsahhaf, Taher A. Elkilani, Amal. (2010). Fundamentals of Petroleum Refining—2.4.2 True Boiling Point Distillation, (pp. 23). Elsevier. (Year: 2010).*

National Institute of Health's Pubchem "Hematite" retrieved from < https://pubchem.ncbi.nlm.nih.gov/compound/hematite> on Sep. 16, 2021 (Year: 2021).*

National Institute of Health's Pubchem "Carbon" retrieved from < https://pubchem.ncbi.nlm.nih.gov/element/6> on Sep. 16, 2021 (Year: 2021).*

International Search Report and Written Opinion issued in International Patent Application No. PCT/IB2016/052207, dated Jul. 20, 2016.

Pandey et al., "Reducing agents and double-layered iron ore pellets," *International Journal of Mineral Processing*, 2000, 59(4): 295-304.

Office Action issued in Corresponding Application No. 3,021,243, dated Feb. 16, 2022.

* cited by examiner

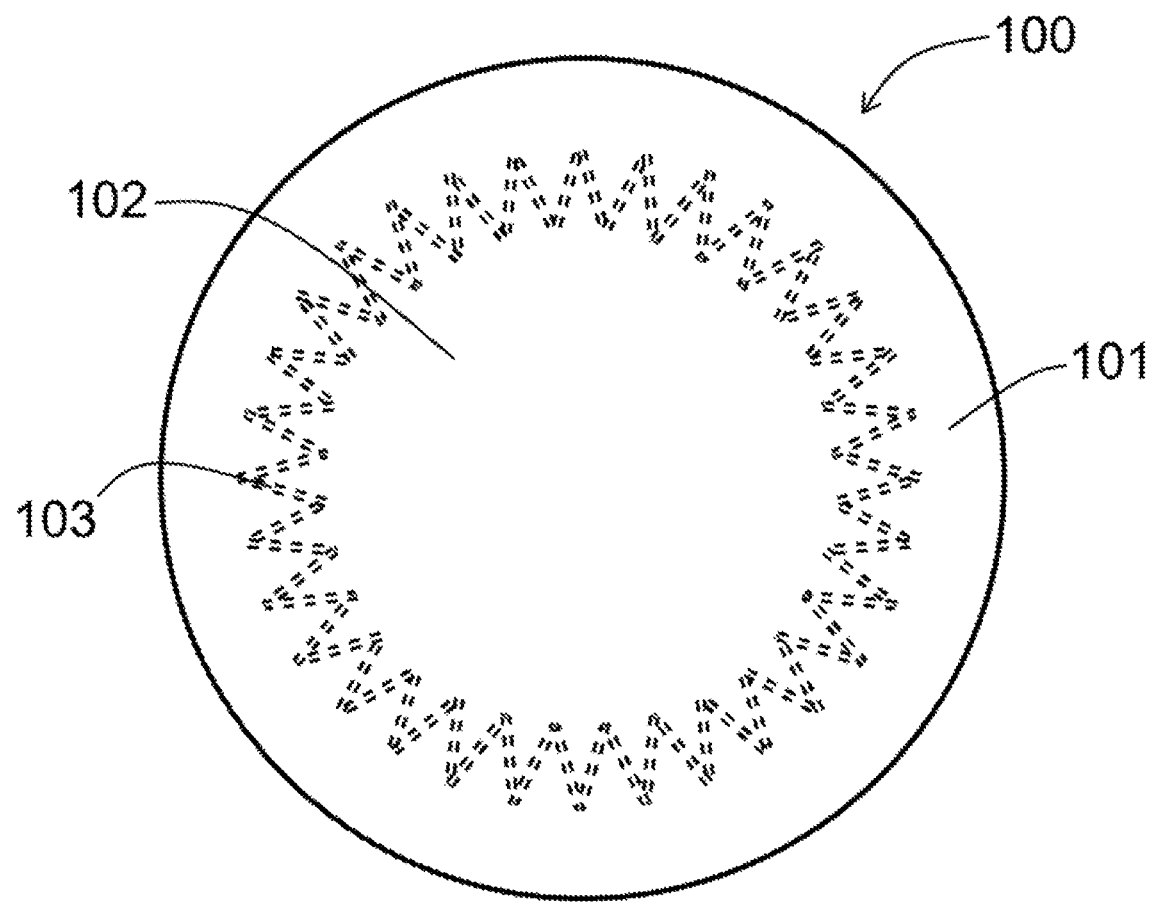

COMPOSITE IRON PELLETS AND METHODS OF MAKING SAME

CROSS-REFERENCE TO RELATED APPLICATIONS

This application is a national phase under 35 U.S.C. § 371 of International Application No. PCT/IB2016/052207, filed Apr. 18, 2016, which claims the benefit of priority of U.S. Provisional Patent Application No. 62/152,291, filed Apr. 24, 2015, the entire contents of each of which are hereby incorporated by reference in their entirety.

FIELD OF INVENTION

The present invention relates to composite pellets having a core and shell structure for use in direct reduced iron (DRI) production.

BACKGROUND OF THE INVENTION

In the ironmaking and steelmaking industry, the current high consumption rate of natural gas and the expected future unavailability of more supporting gas has led to a greater focus on the use of alternative reducing agents as a partial replacement for natural gas. While solid carbon materials have been considered to be one suitable solution, their utilization and integration into steelmaking and iron making processes are continuing to be developed and examined.

Accordingly, there remains a need for ironmaking and steelmaking methods and materials that can provide natural gas consumption savings, while maintaining or increasing productivity. This need and other needs are satisfied by the various aspects of the present disclosure.

SUMMARY OF THE INVENTION

In accordance with the purposes of the invention, as embodied and broadly described herein, the invention provides a composite pellet, methods for making the composite pellet, and methods for using the composite pellet.

In an exemplary aspect, the invention relates to a pellet, comprising (a) a core comprising: (i) iron ore; and (ii) a carbonaceous reducing agent; wherein the carbonaceous reducing agent is present in the core in an amount from about 3 wt % to about 9 wt %, and (b) a shell comprising iron ore; wherein the shell contains from 0 wt % to less than 3 wt % carbonaceous reducing agent, and wherein the core and the shell transition in a manner such that no visible or clearly distinct boundary exists between the core and the shell in a cross-section of the pellet.

In another exemplary aspect, the invention relates to a method, comprising the steps of: (a) forming a pellet core from a mixture comprising an iron ore and a carbonaceous reducing agent; (b) forming a pellet shell around the core of step (a) to produce a composite pellet, wherein the shell comprises iron ore and wherein the core is not dried prior to forming the shell; and (c) drying the composite pellet of step (b); wherein after drying no visible boundary exists between the core and shell in a cross-section of the pellet.

In further aspects, the invention also relates to articles comprising the disclosed composite iron pellets and direct reduced iron made using the disclosed composite iron pellets and methods.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

FIG. 1 shows a drawing illustrating an exemplary composite pellet in accordance with the present invention.

DETAILED DESCRIPTION OF THE INVENTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. DEFINITIONS

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a carbonaceous material" includes mixtures of two or more carbonaceous materials.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, an "optional binder" includes aspects were it is and is not present.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Compounds are described using standard nomenclature. For example, any position not substituted by any indicated group is understood to have its valence filled by a bond as indicated, or a hydrogen atom. A dash ("—") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. COMPOSITE PELLET

As briefly described above, the present disclosure relates, in one aspect, to a composite pellet having a core and shell structure wherein the core and the shell transition in a manner such that no visible or clearly distinct boundary exists between the core and the shell when viewed in a cross-section of the pellet. For example, with reference to FIG. 1, an exemplary composite pellet according to the present invention is shown. A composite pellet 100 is shown that comprises a shell 101 and a core 102. As further illustrated, the core and the shell transition in a region 103 and in a manner such that no visible boundary exists between the shell 101 and the core 102 in a cross-section of the pellet. This lack of clear transition or clear distinct boundary is represented by the dotted zigzag line.

According to aspects, the pellet comprises (a) a core comprising: (i) iron ore; and (ii) a carbonaceous reducing agent; wherein the carbonaceous reducing agent is present in the core in an amount from about 3 wt % to about 9 wt %, and (b) a shell comprising iron ore; wherein the shell contains from 0 to less than 3 wt % carbonaceous reducing agent, and wherein the core and the shell transition in a manner such that no visible boundary exists between the core and the shell in a cross-section of the pellet. In various further aspects, either the core portion, or the shell portion, or both the core and the shell portion of the pellet can also independently comprise at least one of: iron, iron oxide, silicon oxide, calcium oxide, magnesium oxide, aluminum oxide, carbon, and sulfur.

In various aspects, the pellet can have any desired shape. In one aspect, the pellet is in the shape of a sphere, a ball, rod, irregular shape, or briquettes, or a combination thereof. In other aspects, the inner core comprises a carbonaceous material. In yet further aspects, the carbonaceous reducing agent is coal, coke, petroleum coke, char, or charcoal, or a combination thereof. In an even further aspect, the shell comprises high grade iron ore. In a still further aspect, the core and the outer shell region comprise the same iron ore.

In one aspect, the iron ore can comprise iron oxide. In a further aspect, the iron oxide comprises hematite ($Fe_2O_3$; iron (III) oxide), magnetite ($Fe_3O_4$; triiron tetroxide), limonite ($FeO(OH) \cdot n(H_2O)$; hydrated iron (III) oxide hydroxide), siderite ($FeCO_3$; iron (II) carbonate), iron pyrite ($FeS_2$; iron (II) disulfide), goethite ($FeO(OH)$; iron (III) hydroxide), or combinations thereof.

In one aspect, the pellet comprises iron oxide ($Fe_2O_3$) in an amount ranging from greater than 88% by weight to 99% by weight, based on the total weight of the composite iron pellet, including exemplary values 89% by weight, 90% by weight, 91% by weight, 92% by weight, 93% by weight, 94% by weight, 95% by weight, 96% by weight, 97% by weight, and 98% by weight. In still further aspects, the pellet can comprise iron oxide present in a range derived from any two of the above listed exemplary values.

In one aspect, the pellet comprises silicon oxide in an amount ranging from greater than 0% by weight to 3% by weight, based on the total weight of the composite iron pellet, including exemplary values of 0.5% by weight, 0.8% by weight, 1.0% by weight, 1.2% by weight, 1.5% by weight, 1.8% by weight, 2.0% by weight, 2.3% by weight, 2.5% by weight, and 2.8% by weight. In still further aspects, the pellet can comprise silicon oxide present in a range derived from any two of the above listed exemplary values.

In one aspect, the pellet comprises calcium oxide in an amount ranging from greater than 0% by weight to 2% by weight, based on the total weight of the composite iron pellet, including exemplary values of 0.1% by weight, 0.2% by weight, 0.3% by weight, 0.5% by weight, 0.7% by weight, 0.8% by weight, 0.9% by weight, 1.0% by weight, 1.2% by weight, 1.5% by weight, 1.8% by weight, and 1.9% by weight. In still further aspects, the pellet can comprise calcium oxide present in a range derived from any two of the above listed exemplary values.

In one aspect, the pellet comprises magnesium oxide in an amount ranging from greater than 0% by weight to about 1% by weight, based on the total weight of the composite iron pellet, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the pellet can comprise magnesium oxide present in a range derived from any two of the above listed exemplary values.

In one aspect, the pellet comprises aluminum oxide in an amount ranging from greater than 0% by weight to 1% by weight, based on the total weight of the composite iron pellet, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the pellet can comprise aluminum oxide present in a range derived from any two of the above listed exemplary values.

In one aspect, the pellet comprises carbon in an amount ranging from greater than 0% by weight to 9% by weight, based on the total weight of the composite iron pellet, including exemplary values of 0.1% by weight, 0.3% by weight, 0.4% by weight. 1.0% by weight, 1.6% by weight, 2.0% by weight, 2.5% by weight, and 3.0% by weight, 3.5% by weight, 4.0% by weight, 4.5% by weight, 5.0% by weight, 5.5% by weight, 6.0% by weight, 6.5% by weight, 7.0% by weight, 7.5% by weight, 8.0% by weight, 8.5% by weight, and 8.9% by weight. In still further aspects, the pellet can comprise carbon present in a range derived from any two of the above listed exemplary values.

In one aspect, the pellet comprises sulfur in an amount ranging from greater than 0% by weight to 0.1% by weight, based on the total weight of the composite iron pellet.

In one aspect, the core comprises iron ore. As noted above, the iron ore can be present as iron oxide. According to this aspect, the iron oxide ($Fe_2O_3$) can be present in the core in an amount ranging from 88.0% by weight to 97% by weight, based on the total weight of the core, including exemplary values of 89% by weight, 90% by weight, 91% by weight, 92% by weight, 93% by weight, 94% by weight, 95% by weight, and 96% by weight. In still further aspects, the core can comprise iron oxide present in a range derived from any two of the above listed exemplary values. For example, the core can comprise iron oxide in an amount ranging from 91% by weight to 97.0% by weight, based on the total weight of the inner core.

In one aspect, the core comprises silicon oxide in an amount ranging from greater than 0% by weight to 3% by weight, based on the total weight of the core, including exemplary values of 0.5% by weight, 0.8% by weight, 1.0% by weight, 1.2% by weight, 1.5% by weight, 1.8% by weight, 2.0% by weight, 2.3% by weight, 2.5% by weight, and 2.8% by weight. In still further aspects, the core can comprise silicon oxide present in a range derived from any two of the above listed exemplary values.

In one aspect, the core comprises calcium oxide in an amount ranging from greater than 0% by weight to 2% by weight, based on the total weight of the core, including exemplary values of 0.1% by weight, 0.2% by weight, 0.3% by weight, 0.5% by weight, 0.7% by weight, 0.8% by weight, 0.9% by weight, 1.0% by weight, 1.2% by weight, 1.5% by weight, 1.8% by weight, and 1.9% by weight. In still further aspects, the core can comprise calcium oxide present in a range derived from any two of the above listed exemplary values.

In one aspect, the core comprises magnesium oxide in an amount ranging from greater than 0% by weight to about 1% by weight, based on the total weight of the core, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the core can comprise magnesium oxide present in a range derived from any two of the above listed exemplary values.

In one aspect, the core comprises aluminum oxide in an amount ranging from greater than 0% by weight to 1% by weight, based on the total weight of the core, including exemplary values 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the core can comprise aluminum oxide present in a range derived from any two of the above listed exemplary values.

In one aspect, the core comprises carbon in an amount ranging from about 3% by weight to about 9% by weight, based on the total weight of the core, including exemplary values of 3.1% by weight, 3.5% by weight, 4.0% by weight, 4.5% by weight, 5.0% by weight, 5.5% by weight, 6.0% by weight, 6.5% by weight, 7.0% by weight, 7.5% by weight, 8.0% by weight, 8.5% by weight, and 8.9% by weight. In still further aspects, the core can comprise carbon present in a range derived from any two of the above listed exemplary values.

In one aspect, the core comprises sulfur in an amount ranging from greater than 0% by weight to 0.1% by weight, based on the total weight of the core.

In one aspect, the shell comprises high grade iron ore. In a further aspect, the shell comprises iron oxide in an amount ranging from greater than 88% by weight to about 99% by weight, based on the total weight of the shell, including exemplary values 89% by weight, 90% by weight, 91% by weight, 92% by weight, 93% by weight, 94% by weight, 95% by weight, 96% by weight, 97% by weight, and 98% by weight. In still further aspects, the shell can comprise iron oxide in a range derived from any two of the above listed exemplary values. For example, the shell can comprise iron oxide present in an amount ranging from 97% by weight to 99% by weight, based on the total weight of the shell.

In one aspect, the shell comprises silicon oxide in an amount ranging from greater than 0% by weight to 3% by weight, based on the total weight of the shell, including exemplary values of 0.5% by weight, 0.8% by weight, 1.0% by weight, 1.2% by weight, 1.5% by weight, 1.8% by weight, 2.0% by weight, 2.3% by weight, 2.5% by weight, and 2.8% by weight. In still further aspects, the shell can comprise silicon oxide present in a range derived from any two of the above listed exemplary values.

In one aspect, the shell comprises calcium oxide in an amount ranging from greater than 0% by weight to 2% by weight, based on the total weight of the shell, including exemplary values of 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the shell can comprise calcium oxide present in a range derived from any two of the above listed exemplary values.

In one aspect, the shell comprises magnesium oxide in an amount ranging from greater than 0% by weight and about 1% by weight, based on the total weight of the shell, including exemplary values 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the shell can comprise magnesium oxide present in a range derived from any two of the above listed exemplary values.

In one aspect, the shell comprises aluminum oxide in an amount ranging from greater than 0% by weight to 1% by weight, based on the total weight of the shell, including exemplary values 0.1% by weight, 0.2% by weight, 0.3% by weight, 0.4% by weight. 0.5% by weight, 0.6% by weight, 0.7% by weight, 0.8% by weight, and 0.9% by weight. In still further aspects, the shell can comprise aluminum oxide present in a range derived from any two of the above listed exemplary values.

In one aspect, the shell does not comprise carbon. In another aspect, the shell comprises less than about 0.05% by weight carbon based on the total weight of the shell, including exemplary values of less than 0.01% by weight, 0.02% by weight, 0.03% by weight, and 0.04% by weight.

In one aspect, the shell comprises sulfur in an amount less than about 0.05% by weight, based on the total weight of the shell, including exemplary values of less than 0.01% by weight, 0.02% by weight, 0.03% by weight, and 0.04% by weight.

The pellet can be engineered such that the core portion and shell portion are present in any desired relative proportion to each other. In one aspect, the relative proportions can be characterized by the relative weight percent amount of the core and the shell relative to the total weight of the pellet. For example, in one aspect, from about 25 wt % to about 75 wt % of the total weight of the pellet can be present as core portion. Similarly, from about 25 wt % to about 75 wt % of the total weight of the pellet can be present as shell portion. It should be understood that according to these aspects, the total weight percentages of core and shell will be 100 weight percent such that the combined weight percent value of all components does not exceed about 100 wt %; and all weight percent values are based on the total weight of the pellet. The relative proportions of the core and shell portions of the pellet can also be characterized by the pellets average cross sectional diameter. For example, in one aspect, the core thickness when viewed in cross section can be from about 25% to about 75% of the pellet's total cross sectional diameter. Similarly, the shell thickness when viewed in cross section can be from about 25% to about 75% of the pellet's diameter.

In one aspect, the composite pellet can comprise a binder. The binder can be present in the core, in the shell or in both the core and the shell. In a further aspect, the binder can comprise dextrin, bentonite or molasses, or a mixture thereof. In a still further aspect, the binder is bentonite. In a yet further aspect, the binder is molasses.

In a further aspect, the binder can be present in an amount from about 1.0 wt % to about 8.0 wt %, based on the total weight of the iron composite pellet, including the exemplary values of 1.5 wt %, 2.0 wt %, 3.5 wt %, 4.0 wt %, 4.5 wt %, 5.0 wt %, 5.5 wt %, 6.0 wt %, 6.5 wt %, 7.0 wt %, and 7.5 wt %. In a still further aspect, the binder can be present in a range derived from any two of the above listed exemplary wt %. For example, the binder can be present in an amount from about 1.0 wt % to about 7.0 wt %.

Referring again to FIG. 1, the composite pellet can further be characterized as comprising an intermediate region between the core portion and the shell portion. This intermediate region as shown by zigzag line 103 in FIG. 1 represents the transition between the core and shell portions and can be characterized by a weight % gradient of carbonaceous reducing agent from the weight % present in the core to the weight % present in the shell. For example, a gradient of carbonaceous reducing agent that decreases outwardly from the core towards the shell can be present in this intermediate region as the amount of carbonaceous reducing agent decreases from the core amount that can be present in an amount from about 3 wt % to about 9 wt % to the shell amount that can be present in an amount from 0 to less than 3 wt %.

In various aspects, the composite pellet has improved properties in physical, mechanical, chemical, and metallurgical properties.

In addition to the foregoing components, the disclosed composite pellet can optionally comprise a balance amount of one or more additive materials ordinarily incorporated in composite compositions of this type, with the proviso that the additives are selected so as to not significantly adversely affect the desired properties of the composite pellet. Combinations of additives can be used. Such additives can be mixed at a suitable time during the mixing of the components for forming the composite pellets.

C. METHODS OF MAKING THE COMPOSITE PELLETS

Also disclosed herein are methods of making the composite pellets described above. In various aspects, the composite pellets of the present invention can be manufactured by a number of methods. In one aspect, the composite pellets of the present invention can be blended with the aforementioned ingredients by a variety of methods involving admixing of the materials with any additional additives desired in the formulation. For example, the materials can be mixed using conventional methods such as with an intensive mixer, such as a R02 Eirich mixer or any other mixing equipment.

In one aspect, various pelletizing methods can be used to shape or form the composite iron pellets. In various further aspects, the pelletizing equipment used in such processing methods includes, but is not limited to, the following: a disc pelletizer, a pan pelletizer, or a drum pelletizer, and various other types of pelletizing equipment. Methods of pelletizing are known to those of skill in the art, as described in B. Agrawal, K. Prasad, S. Sarkar and H. ray, Ironmaking & steelmaking, 2001, vol. 28, No. 1, 23, which is hereby incorporated by reference.

In one aspect, the invention provides a method, comprising the steps of: (a) forming a pellet core from a mixture comprising an iron ore and a carbonaceous reducing agent; (b) forming a pellet shell around the core of step (a) to produce a composite pellet, wherein the shell comprises iron ore and wherein the core is not dried prior to forming the shell; and (c) drying the composite pellet of step (b); wherein after drying no visible boundary exists between the core and shell in a cross-section of the pellet.

In some aspects, the core mixture of a) further comprises a binder. In other aspects, the shell further comprises a binder.

In one aspect, the method comprises a first pelletizer and a second pelletizer. In a further aspect, the pellet core is formed in the first pelletizer. In a still further aspect, the pellet shell is formed in the second pelletizer. In a yet further aspect, after formation, the core is moved directly to the second pelletizer to form the pellet shell. In an even further aspect, the first pelletizer and second pelletizer are connected such that the formed composite core is discharged from the first pelletizer directly into the second pelletizer.

In some aspects, the core is not dried prior to forming the shell. In various aspects, the composite pellet can be dried using conventional methods, such as, for example, in the sun for a period of 1-4 days or heating in a drying oven.

In some aspects, the composite pellet can be made by firing. In a further aspect, the pellet is direct fired after shell formation. For example, the composite pellet firing can be performed using the techniques described in S. Prakash, The Journal of The South African Institute of Mining and Metallurgy, JANUARY/FEBRUARY, 1996, 3-16, which is incorporated by reference in its entirety for its teaching of firing. In a still further aspect, after drying, the composite pellet is fired under conditions effective to result in no visible boundary existing between the inner core and outer shell.

In one aspect, the temperature of the firing is maintained at a temperature between about 1000° C. and about 1500° C. For example, it can be desirable to maintain the firing temperature between about 1000° C. and about 1200° C., although higher temperatures can be used provided that the residence time in the processing equipment is adjusted.

D. METHODS OF USING THE COMPOSITE PELLETS

Also disclosed herein are methods of using the composite pellets described above. In various aspects, the composite pellets of the present invention can be used to produce iron by various methods. In one aspect, the composite pellets of the present invention can be used in the production of direct reduced iron (DRI). For example, the composite pellets can be used in DRI production using conventional methods such as, in the presence of a second reducing agent with a furnace, for example, a MIDREX furnace, or HYL III furnace, or any other DRI production equipment. For example, the composite pellet firing can be used in DRI production techniques described in Direct reduced iron: Technology and Economics of Production and Use, ed. by J. Feinman and D. R. Mac Rae, ISS, Warrendale, Pa., (1999), which is incorporated by reference in its entirety for its teaching of DRI production.

Direct reduction ("DR") of iron, e.g. iron oxide or iron ore, generates metallic iron in solid form, also referred to as direct reduced iron ("DRI"), by removing oxygen using a reducing gas comprising hydrogen and carbon monoxide. In some cases, the reducing gas can be provided from the synthesis gas obtained from natural gas by steam methane reforming. Alternatively, the reducing gas can be produced in situ in the reducing reactor from supplied natural gas and oxygen. The reducing process can be illustrated by the following chemical reaction, where water and carbon dioxide are obtained as reaction byproducts:

$$Fe_2O_3 + H_2 \rightarrow 2Fe + 3H_2O$$

$Fe_2O_3 + CO \rightarrow 2Fe + CO_2$

Iron obtained from a DR process can be cooled and carbonized, e.g. by counterflowing gases in the lower portion of a direct reduction reactor according to the following reaction:

$3Fe + CO + H_2 \rightarrow Fe_3C + H_2O$ $3Fe + CH_4 \rightarrow Fe_3C + 2H_2$ $3Fe + 2CO \rightarrow Fe_3C + CO_2$ By the foregoing chemical processes, products such as cold direct reduction iron, hot briquetted iron, and hot direct reduction iron can be manufactured.

In addition to the chemical reactions described herein above, methane reforming and water gas shift reactions can also occur in the gas phase based on the composition of the input reduction gas and operating temperatures in the reduction reaction vessel. These additional gas phase reactions include the following:

$CH_4 + 2H_2O \rightarrow CO_2 + 4H_2$ $CO_2 + H_2 \rightarrow CO + H_2O$

Thus, the gas exiting a direct reduction reactor, i.e. off-gas or top gas, comprises both unreacted gases present in the input reducing gas mixture and the gaseous reaction products illustrated in the reactions above. In addition, the input reducing gas mixture can comprise additional components such nitrogen. The top gas is a complex gaseous mixture comprising nitrogen, methane, water vapor, hydrogen, carbon dioxide, and carbon monoxide.

In various DR processes, the top gas can be cleaned by scrubbing and carbon dioxide removed. For example, the top gas, following scrubbing and carbon dioxide removal, can be recycled back into the reducing gas stream and utilized for further direct reduction of iron.

In various aspects, the direct reduction process comprises a first module for reducing iron oxide comprising a first reducing gas inlet, a first reducing reactor, and a top gas outlet; wherein the first module, during operation, produces metallic iron and expels a top gas via the top gas outlet. An example of the first module for reducing iron by a direct reduction process is a production module or plant commonly using the Midrex® direct reduction process. In a further aspect, the first module for reducing iron oxide by direct reduction process utilizes a Midrex® direct reduction process and comprises a first reducing gas inlet, a first reducing reactor, and a top gas outlet, wherein the first module, during operation, produces metallic iron and expels a top gas via the top gas outlet.

In various aspects, the first module direct reduction process can be characterized by use of a low pressure reducing gas introduced to a moving bed shaft reactor where the reducing gas moves counter-current to the lump iron oxide (or alternatively, lump iron oxide pellets). In this case, the reducing gas (from about 10 mol % to about 20 mol % CO; and from about 80 mol % to about 90 mol % $H_2$) of the first module direct reduction process is typically produced from natural gas using a $CO_2$ reforming process in combination with a catalyst, e.g. Midrex reforming process with the Midrex proprietary catalyst. The first module direct reduction process is further characterized by a single reformer rather than a reformer/heater combination and by lack of a requirement to cool the reducing gas prior to introduction to the shaft reactor.

In various aspects, the first reducing reactor is a moving bed shaft reactor. Appropriate reactor designs are commercially available from Midrex Technologies, Inc. (Charlotte, N.C., US). In a further aspect, the first reducing reactor comprises a vertical cylindrical vessel containing an internal refractory insulation, wherein the iron oxide flows down by gravity and is contacted by an upward flowing reducing gas. In a still further aspect, the iron oxide is present as iron oxide pellets or lump iron ore.

In a further aspect, the first reducing gas inlet introduces to the first reducing reactor a reducing gas at a pressure from about 1 bar to about 1.5 bar at a temperature from about 800° C. to about 850° C. The reducing gas can generally be formed natural gas or other gaseous stream that can be reformed or cracked to produce $H_2$ or CO to be used in the reduction of the iron oxide. In general, high methane containing natural gas is the most common form of input gas for the formation of the reducing gas. The input gas may be a byproduct of other processes. In a still further aspect, the reducing gas mixture is formed from natural gas and water. In a yet further aspect, the reducing gas mixture comprises carbon monoxide and hydrogen.

Alternatively, the direct reduction process comprises a first module for reducing iron oxide comprising a first reducing gas inlet, a reducing reactor, a reducing gas heater, and a steam boiler; wherein the first module, during operation, produces metallic iron; and wherein the reducing reactor, during operation, produces metallic iron and operates at a pressure of at least about 5 bar. An example of the alternative first module for reducing iron by a direct reduction process is a production module or plant commonly using the HYL® direct reduction process. In a further aspect, the first module for reducing iron oxide by direct reduction process utilizes a HYL® direct reduction process comprising a reducing gas inlet, a reducing reactor, a reducing gas heater, and a steam boiler, wherein the reducing reactor, during operation, produces metallic iron; and wherein the second module, during operation, produces metallic iron and operates at a pressure of at least about 5 bar.

The alternative first module direct reduction process is characterized by use of a high pressure reducing gas introduced to a moving bed shaft reactor where the reducing gas moves counter-current to the lump iron oxide (or alternatively, lump iron oxide pellets). In this case, the reducing gas is generated by self-reforming in the second reduction reactor, with make-up gas—typically natural gas—being provided to the reducing gas circuit and injecting oxygen at the inlet of the second reducing reactor. The HYL®-type direct reduction process is further characterized by a reducing gas heater. The HYL®-type direct reduction process can optionally comprise a steam methane reforming unit.

In various aspects, the reducing reactor is a moving bed shaft reactor. Appropriate reactor designs are commercially available from Tenova HYL (Coraopolis, Pa., US). In a further aspect, the reducing reactor comprises a vertical cylindrical vessel, wherein iron oxide is introduced to the second reducing reactor via a sealing mechanism that is based upon a pressure lock system. In a still further aspect, once the iron oxide is introduced in the second reducing reactor, it flows down by gravity and is contacted by an upward flowing reducing gas. In a still further aspect, the iron oxide is present as iron oxide pellets, lump iron ore, or mixture thereof.

It is understood in the foregoing discussion that reference to iron oxide comprises the composite iron ore pellets of the present invention. Moreover, the composite iron ore pellets of the present invention can be utilized in other direct reduction processes as known to one skilled in the art.

In one aspect, the invention provides an iron oxide-reducing system comprising: a) a module for reducing iron oxide by direct reduction process, the module comprising a reducing gas inlet, a reducing reactor, and a top gas outlet; b) providing the disclosed composite pellet to the reducing reactor; c) carrying out direct reduction of the composite pellet; and d) expel the reduced iron from the reducing reactor.

Optionally, in various aspects, the disclosed composite pellets can be produced on an industrial scale, and the disclosed methods can be operated or performed on an industrial scale. In one aspect, the methods disclosed herein can be configured to produce pellets on an industrial scale. For example, according to further aspects, the methods can produce batches of pellets on an industrial scale. In a further aspect, the batch size can comprise any desired industrial-scale batch size.

In one aspect, the batch size can optionally be at least about 1 kg, including exemplary batch sizes of at least about 10 kg, at least about 25 kg, at least about 50 kg, at least about 100 kg, at least about 250 kg, at least about 500 kg, at least about 750 kg, at least about 1,000 kg, at least about 2,500 kg, or greater. In an additional aspect, the batch size can optionally range from about 1 kg to about 2,500 kg, such as, for example, from about 10 kg to about 1,000 kg, from about 1,000 kg to about 2,500 kg, from about 100 kg to about 500 kg, from about 500 kg to about 1,000 kg, from about 10 kg to about 100 kg, from about 100 kg to about 250 kg, from about 500 kg to about 750 kg, or from about 750 kg to about 1,000 kg.

In another aspect, the batch size can optionally be at least about 1 ton, including exemplary batch sizes of at least about 10 tons, at least about 25 tons, at least about 50 tons, at least about 100 tons, at least about 250 tons, at least about 500 tons, at least about 750 tons, at least about 1000 tons, at least about 2,500 tons, or greater. In an additional aspect, the batch size can optionally range from about 1 ton to about 2,500 tons, such as, for example, from about 10 tons to about 1,000 tons, from about 1,000 tons to about 2,500 tons, from about 100 tons to about 500 tons, from about 500 tons to about 1,000 tons, from about 10 tons to about 100 tons, from about 100 tons to about 250 tons, from about 500 tons to about 750 tons, or from about 750 tons to about 1,000 tons.

In various aspects, the disclosed methods can be operated or performed on any desired time scale or production schedule that is commercially practicable. In one aspect, the disclosed methods can produce a quantity of at least 1 ton of pellets in a period of 1 day or less, including exemplary quantities of at least about 10 tons, 100 tons, 500 tons, or 1,000 tons, 2,500 tons, or greater within the period. In a further aspect, the period of time can be 1 hour. In a still further aspect, the quantity of pellets produced can range from about 1 ton to about 1,000 tons, and the period of time can range from about 1 hour to about 1 year, for example, about 10 to about 1,000 tons in a period of about 1 hour to about 1 day.

E. ARTICLES OF MANUFACTURE

In various aspects, the disclosed composite pellets of the present invention can be used in making articles formed from iron. The iron made from the disclosed composite pellets can be formed into useful shaped articles by a variety of means such as: casting, molding, extrusion, and the like.

F. ASPECTS

In various aspects, the present invention pertains to and includes at least the following aspects.

Aspect 1: A pellet, comprising: (a) a core comprising: (i) iron ore; and (ii) a carbonaceous reducing agent; wherein the carbonaceous reducing agent is present in the core in an amount from about 3 wt % to about 9 wt %; and (b) a shell comprising iron ore; wherein the shell contains from 0 wt % to less than 3 wt % carbonaceous reducing agent; and wherein the core and the shell transition in a manner such that no visible boundary exists between the core and the shell in a cross-section of the pellet. Aspect 2: The pellet of aspect 1, wherein the carbonaceous material is coke, pet coke, char, or charcoal, or a combination thereof; and wherein the shell comprises high grade iron ore. Aspect 3: The pellet of aspect 1, further comprising an intermediate region between the core and the shell wherein said intermediate region is characterized by a weight % gradient of carbonaceous reducing agent from the weight % in the core to the weight % in the shell. Aspect 4: The pellet of aspect 1, wherein the pellets are fired. Aspect 5: The pellet of aspect 1, wherein the core and the shell comprise the same iron ore. Aspect 6: The pellet of aspect 1, wherein the shell comprises unreduced iron oxide (Fe2O3). Aspect 7: The pellet of aspect 1, wherein the pellets are used in direct reduced iron (DRI) production in the presence of a second reducing agent. Aspect 8: The pellet of aspect 7, wherein the DRI production takes place in a vertical shaft furnace. Aspect 9: The pellet of aspect 7, wherein the second reducing agent is reformed natural gas. Aspect 10: The pellet of aspect 1, wherein the shell contains from 0 wt % to less than 2 wt % carbonaceous reducing agent. Aspect 11: The pellet of aspect 1, wherein the core comprises at least 3 wt % carbon. Aspect 12: The pellet of aspect 1, wherein the core comprises from about 3 wt % to about 9 wt % carbon. Aspect 13: The pellet of aspect 1, wherein the core comprises unreduced iron oxide (Fe2O3). Aspect 14: The pellet of aspect 1, wherein the composite iron pellet further comprises a binder. Aspect 15: The pellet of aspect 1, wherein the inner core comprises from about 25 wt % to about 75 wt %, and the outer shell comprises from about 25 wt % to about 75 wt %; wherein the combined weight percent value of all components does not exceed about 100 wt %; and wherein all weight percent values are based on the total weight of the pellet. Aspect 16: The pellet of aspect 1, wherein the core comprises at least about 3 wt % carbon. Aspect 17: The pellet of aspect 3, wherein the core comprises less than about 3 wt % carbon. Aspect 18: The pellet of aspect 1, wherein the shell comprises at least 90 wt % Fe2O3. Aspect 19: The pellet of aspect 1, wherein the pellet comprises at least 90 wt % Fe2O3. Aspect 20: The pellet of aspect 1, wherein the pellet comprises from greater than 0 wt % to about 1 wt % Al2O3. Aspect 21: The pellet of aspect 1, wherein the pellet comprises from greater than 0 wt % to about 3.0 wt % SiO2. Aspect 22: The pellet of aspect 1, wherein the pellet comprises from greater than 0 wt % to about 1.0 wt % CaO. Aspect 23: The pellet of aspect 1, wherein the pellet comprises from greater than 0 wt % to about 1.0 wt % MgO. Aspect 24: The pellet of aspect 1, wherein the pellet has an average pellet size of at least about 12 mm. Aspect 25: The pellet of aspect 1, wherein the iron ore comprises particles having a diameter ranging from greater than 0 mm to about 3 mm. Aspect 26: The pellet of aspect 1, wherein the particle size of the iron ore used to make the core and the particle size of the iron ore used to make the shell are substantially the same size.

Aspect 27: A method, comprising the steps of: (a) forming a pellet core from a mixture comprising an iron ore and at least one carbonaceous reducing agent; (b) forming a pellet shell around the core of step (a) to produce a composite pellet, wherein the shell comprises iron ore and wherein the core is not dried prior to forming the shell; and (c) drying the composite pellet of step (b); wherein after drying no visible boundary exists between the core and shell in a cross-section of the pellet. Aspect 28: The method of aspect 27, further comprising firing the composite pellet. Aspect 29: The method of aspect 27, wherein the mixture of (a) or the shell further comprises a binder. Aspect 30: The method of aspect 27, wherein the mixture of (a) and the shell comprise the same iron ore. Aspect 31: The method of aspect 27, wherein the iron mixture of (a) and the shell comprise substantially the same particle size. Aspect 32: The method of aspect 27, wherein the pellet core is formed in a first pelletizer; wherein the pellet shell is formed around the core in a second pelletizer, and wherein the first pelletizer and second pelletizer are connected such that the formed composite core is discharged from the first pelletizer directly into the second pelletizer. Aspect 33: The method of aspect 27, wherein after drying the composite core shell pellet is fired at high temperatures and wherein after firing no visible boundary exists between the inner core and outer shell. Aspect 34: The method of aspect 27, wherein the core and the shell comprise the same iron ore. Aspect 35: The method of aspect 27, wherein the shell comprises unreduced iron oxide ($Fe_2O_3$). Aspect 36: The method of aspect 27, wherein the shell contains from 0 wt % to less than 3 wt % carbonaceous reducing agent. Aspect 37: The method of aspect 27, wherein the core comprises at least 3 wt % carbon. Aspect 38: The method of aspect 27, wherein the core comprises from about 3 wt % to about 9 wt % carbon. Aspect 39: The method of aspect 27, wherein the core comprises unreduced iron oxide ($Fe_2O_3$). Aspect 40: The method of aspect 27, wherein the composite iron pellet further comprises a binder. Aspect 41: The method of aspect 27, wherein the core comprises from about 25 wt % to about 75 wt %, and the outer shell comprises from about 25 wt % to about 75 wt %; wherein the combined weight percent value of all components does not exceed about 100 wt %; and wherein all weight percent values are based on the total weight of the pellet. Aspect 42: The method of aspect 27, wherein the core comprises at least about 3 wt % carbon. Aspect 43: The method of aspect 27, wherein the shell comprises at least 90 wt % $Fe_2O_3$. Aspect 44: The method of aspect 27, wherein the pellet comprises at least 90 wt % $Fe_2O_3$. Aspect 45: The method of aspect 27, wherein the pellet comprises from greater than 0 wt % to about 1 wt % $Al_2O_3$. Aspect 46: The method of aspect 27, wherein the pellet comprises from greater than 0 wt % to about 3.0 wt % $SiO_2$. Aspect 47: The method of aspect 27, wherein the pellet comprises from greater than 0 wt % to about 1.0 wt % CaO. Aspect 48: The method of aspect 27, wherein the pellet comprises from greater than 0 wt % to about 1.0 wt % MgO. Aspect 49: The method of aspect 27, wherein the pellet has an average pellet size of at least about 12 mm. Aspect 50: The method of aspect 27, wherein the iron ore comprises particles having a diameter ranging from greater than 0 mm to about 3 mm. Aspect 51: The method of aspect 27, wherein the particle size of the iron ore used to make the core and the particle size of the iron ore used to make the shell are substantially the same size. Aspect 52: The method of aspect 27, wherein the method comprises: (a) forming a pellet core from a mixture comprising an iron ore and at least one carbonaceous reducing agent; wherein the carbonaceous reducing agent is present in the core in an amount from about 3 wt % to about 9 wt %; (b) forming a pellet shell around the core of step (a) to produce a composite pellet, wherein the shell comprises iron ore and wherein the core is not dried prior to forming the shell; and wherein the pellet shell contains from 0 wt % to less than 3 wt % carbonaceous reducing agent; (c) drying the composite pellet of step (b); wherein after drying no visible boundary exists between the core and shell in a cross-section of the pellet.

Aspect 53: A method for producing iron comprising: (a) providing the pellet of aspects 1-27; (b) charging the pellet to a furnace; and (c) reducing the pellet in the presence of reformed natural gas to thereby provide iron. Aspect 54: The method of aspect 53, wherein the pellet is fired or cold bonded. Aspect 55, the method of aspect 53, wherein the iron is produced cold or hot.

Without further elaboration, it is believed that one skilled in the art can, using the description herein, utilize the present invention. The following examples are included to provide additional guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

G. EXAMPLES

The following prophetic examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, temperatures, pressures and other reaction ranges and conditions that can be used to optimize the product obtained from the described process. Only routine experimentation, if any, will be required to optimize such process conditions. Several methods for preparing the pellets of this invention are illustrated in the following prophetic examples.

Example 1

In one aspect, Table 1 and 2 below show the typical analysis of iron ore or iron oxide fines that can be used to produce the composite pellets. In further aspects, other ingredients can include various amounts of carbon, sulfur, sodium, potassium, zinc, chlorine, fluorine, and/or water.

TABLE 1*

| Element | Oxide fines/ores |
| --- | --- |
| Fe-Tot | 65.7 |
| Fe2O3 | 96.6 |
| MgO | 0.8 |
| Al2O3 | 0.3 |
| SiO2 | 0.8 |
| P2O5 | 0.2 |
| SO3 | 0.0 |
| CaO | 0.6 |
| TiO2 | 0.0 |
| V2O5 | 0.0 |
| MnO | 0.6 |
| ZnO | 0.0 |
| PbO | 0.0 |
| Others | 0.0 |
| Total | 100.0 |

*Amounts provided in terms of percent of total composition (by weight).

TABLE 2*

| Element | Oxide fines/ores | Oxide fines/ores |
| --- | --- | --- |
| Na2O | 0.1100 | 0.0945 |
| MgO | 0.1350 | 0.4975 |
| Al2O3 | 0.3000 | 0.3915 |
| SiO2 | 1.8150 | 2.8450 |
| P2O5 | 0.0710 | 0.0970 |
| K2O | 0.0082 | 0.0250 |
| CaO | 0.7810 | 0.0082 |
| TiO2 | 0.0345 | 1.0700 |
| V2O5 | 0.0040 | 0.0373 |
| Cr2O3 | 0.0328 | 0.0078 |
| MnO | 0.0554 | 0.0379 |
| Fe2O3 | Balance | 0.1100 |
| Total | 100.0 | 100.00 |

*Amounts provided in terms of percent of total composition (by weight).

In one aspect, pellet core batches can be prepared by pre-blending all constituents (with or without a binder) in a dry-blend and mixed for a desired duration. The pre-blend mixture can then be fed directly into a first disc pelletizer. The shell can be prepared by pre-blending all shell constituents (with or without a binder) in a dry-blend and mixed for a desired duration. The core extrudate can then be pelletized, and then moved directly to a second pelletizer for the shell formation. The shell pre-blend mixture can then be applied directly to the core pellet using the second pelletizer and dried at a suitable temperature for a suitable duration. In some aspects, pellets will be air dried. In other aspects, pellets will be fired.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A pellet comprising:
25 wt. % to 75 wt. % of a core wherein the core comprises: from 93 wt. % to 97 wt. % of an iron ore in the core and from 3 wt. % to 7 wt. % of a carbonaceous reducing agent, based on the total weight of the core;
25 wt. % to 75 wt. % of a shell comprising an iron ore in the shell wherein the shell contains from 0 wt. % to less than 3 wt. % the carbonaceous reducing agent based on the total weight of the shell;
and an intermediate region between the core and the shell;
wherein the core and the shell transition in a manner such that no clearly distinct boundary exists between the core and the shell in a cross-section of the pellet;
wherein the iron ore in both the core and the shell comprises at least one member selected from the group consisting of hematite, magnetite, limonite, siderite, iron pyrite and goethite; and
wherein the pellet comprises from greater than 0 wt. % to 3 wt. % silicon oxide.

2. The pellet of claim 1, wherein the iron ore in both the core and the shell comprises at least one member selected from the group consisting of magnetite, limonite, siderite, iron pyrite and goethite.

3. The pellet of claim 1, wherein the iron ore in the core comprises hematite.

4. The pellet of claim 1, where the iron ore in both the core and the shell comprises at least one member selected from the group consisting of limonite, siderite, iron pyrite and goethite.

5. The pellet of claim 1, wherein the carbonaceous reducing agent comprises charcoal.

6. The pellet of claim 1, wherein the shell contains at least some to less than 2 wt % carbonaceous reducing agent.

7. The pellet of claim 1, wherein the core comprises 3.1 wt. % of the carbonaceous reducing agent.

8. The pellet of claim 1, wherein the shell further comprises a binder comprising at least one member selected from the group consisting of bentonite, molasses, and dextrin.

9. The pellet of claim 1, wherein the core comprises from 95 wt. % to 97 wt. % of the iron ore.

10. The pellet of claim 8, wherein the pellet comprises from about 1.0 wt % to about 8.0 wt % of the binder.

11. A method to prepare the pellet of claim 1, comprising the steps of:
(a) forming a core from a mixture comprising an iron ore and at least one carbonaceous reducing agent;
(b) forming a shell around the core to produce a composite pellet, wherein the shell comprises iron ore and wherein the core is not dried prior to forming the shell; and
(c) drying the composite pellet.

12. A method for producing iron comprising
(a) providing the pellet of claim 1;
(b) charging the pellet to a furnace; and
(c) reducing the pellet in the presence of reformed natural gas to thereby provide iron.

13. A pellet comprising:
25 wt. % to 75 wt. % of a core wherein the core comprises: from 93 wt. % to 97 wt. % of an iron ore and from 3 wt. % to 7 wt. % of a carbonaceous reducing agent, based on the total weight of the core;
25 wt. % to 75 wt. % of a shell comprising the iron ore, wherein the shell contains from 0 wt. % to less than 3 wt. % of the carbonaceous reducing agent based on the total weight of the shell;
an intermediate region between the core and the shell;
wherein the core and the shell transition in a manner such that no clearly distinct boundary exists between the core and the shell in a cross-section of the pellet;
wherein the iron ore in both the core and the shell comprises at least one member selected from the group consisting of hematite, magnetite, limonite, siderite, iron pyrite and goethite; and
wherein the shell further comprises a binder comprising at least one member selected from the group consisting of dextrin, bentonite and molasses.

14. The pellet of claim 13, wherein the binder comprises bentonite.

15. A pellet comprising:
25 wt. % to 75 wt. % of a core wherein the core comprises iron oxide and from about 3 wt. % to about 9 wt. % of a carbonaceous reducing agent, based on the total weight of the core;
25 wt. % to 75 wt. % of a shell comprising iron ore and from at least some to less than 3 wt. % of the carbonaceous reducing agent based on the total weight of the shell; and
wherein the pellet comprises $Fe_2O_3$ in an amount ranging from greater than 88 wt. % to 99 wt. %, based on the total weight of the pellet,
wherein the pellet further comprises a binder selected from the group consisting of bentonite, molasses and dextrin.

16. The pellet of claim 15, wherein the pellet comprises an intermediate region between the core and the shell; wherein the core and the shell transition in a manner such that no clearly distinct boundary exists between the core and the shell in a cross-section of the pellet.

17. The pellet of claim 15, wherein the pellet comprises 93 wt. % to 99 wt. % $Fe_2O_3$, based on the total weight of the pellet.

* * * * *